United States Patent
Funk et al.

(10) Patent No.: US 11,299,118 B2
(45) Date of Patent: Apr. 12, 2022

(54) AIRBAG MODULE, METHOD FOR MOUNTING SAID AIRBAG MODULE AND STEERING ASSEMBLY COMPRISING SUCH AIRBAG

(71) Applicant: TRW Automotive Safety Systems GmbH, Aschaffenburg (DE)

(72) Inventors: André Funk, Aschaffenburg (DE); Marc Friess, Leidersbach (DE); Markus Haas, Oberzent (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 150 days.

(21) Appl. No.: 16/664,979

(22) Filed: Oct. 28, 2019

(65) Prior Publication Data
US 2020/0139917 A1    May 7, 2020

(30) Foreign Application Priority Data

Nov. 6, 2018  (DE) .................... 10 2018 127 637.0

(51) Int. Cl.
*B60R 21/203*    (2006.01)
(52) U.S. Cl.
CPC ................ *B60R 21/2035* (2013.01)
(58) Field of Classification Search
CPC .................................... B60R 21/2035
See application file for complete search history.

(56) References Cited

U.S. PATENT DOCUMENTS 5,421,607 A * 6/1995 Gordon ................. B60R 21/217
                                                    280/728.2
5,580,082 A    12/1996 Shiga et al.
(Continued)

FOREIGN PATENT DOCUMENTS

DE         29616892 U1 *  1/1997  ......... B60R 21/2035
DE    102014015772 A1 *  8/2015  ......... B60R 21/2035
(Continued)

*Primary Examiner* — Nicole T Verley
(74) *Attorney, Agent, or Firm* — Tarolli, Sundheim, Covell & Tummino LLP

(57) ABSTRACT

The invention relates to an airbag module (16) for an occupant restraint system, comprising a module cap (28) which in the mounted condition of the airbag module (16) faces an occupant and comprising a module bottom (30) which includes a latch means for securing the airbag module (16) to a vehicle component, wherein the module cap (28) and the module bottom (30) are movable toward each other along a mounting axis (A) until they reach at first an axial pre-mounting position and then an axial final mounting position, the module cap (28) and the module bottom (30) including interacting pre-fixing elements which captively secure the module cap (28) and the module bottom (30) to each other in the pre-mounting position, the module cap (28) and the module bottom (30) including interacting resistance contours which during an axial relative movement of the module cap (28) and the module bottom (30) from the pre-mounting position to the final mounting position have a predetermined mounting resistance. Furthermore, the invention also relates to a method for mounting the airbag module (16) on a steering wheel as well as to a steering assembly (10) comprising such airbag module (16).

19 Claims, 4 Drawing Sheets

(56) References Cited

U.S. PATENT DOCUMENTS

| | | | | |
|---|---|---|---|---|
| 5,829,777 | A * | 11/1998 | Sakurai | B60R 21/217 280/728.2 |
| 6,186,535 | B1 * | 2/2001 | Sugiyama | B60R 21/217 280/728.2 |
| 6,419,261 | B1 * | 7/2002 | Ibe | B60R 21/217 280/728.2 |
| 6,547,272 | B1 * | 4/2003 | Klozik | B60R 21/2035 280/728.2 |
| 6,702,319 | B2 * | 3/2004 | Sczeburek | B60R 21/217 280/728.2 |
| 7,708,309 | B2 * | 5/2010 | Kim | B60R 21/2035 280/731 |
| 8,907,235 | B2 * | 12/2014 | Chevalier | B60Q 5/003 200/61.54 |
| 9,016,719 | B2 * | 4/2015 | Amamori | B60R 21/2037 280/731 |
| 10,744,968 | B2 * | 8/2020 | Kim | B60R 21/217 |
| 2002/0109337 | A1 * | 8/2002 | Kassman | B60R 21/217 280/728.2 |
| 2005/0206132 | A1 * | 9/2005 | Olesko | B60R 21/2035 280/728.2 |
| 2011/0304126 | A1 * | 12/2011 | Matsu | B60R 21/2035 280/728.2 |
| 2017/0050603 | A1 * | 2/2017 | Spencer | B60R 21/2035 |
| 2019/0054885 | A1 * | 2/2019 | Kim | B60R 21/2035 |

FOREIGN PATENT DOCUMENTS

| | | | | |
|---|---|---|---|---|
| DE | 102015011828 | A1 * | 3/2017 | ......... B60R 21/2035 |
| EP | 1777121 | A2 * | 4/2007 | ......... B60R 21/2035 |
| WO | WO-0156841 | A1 * | 8/2001 | ......... B60R 21/2035 |
| WO | WO-2013080753 | A1 * | 6/2013 | ......... B60R 21/2037 |

* cited by examiner

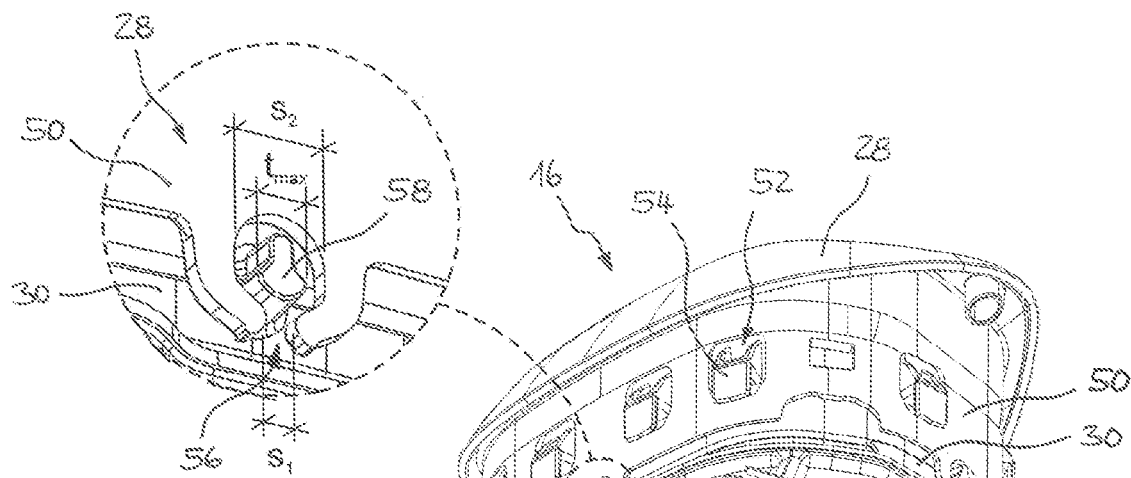
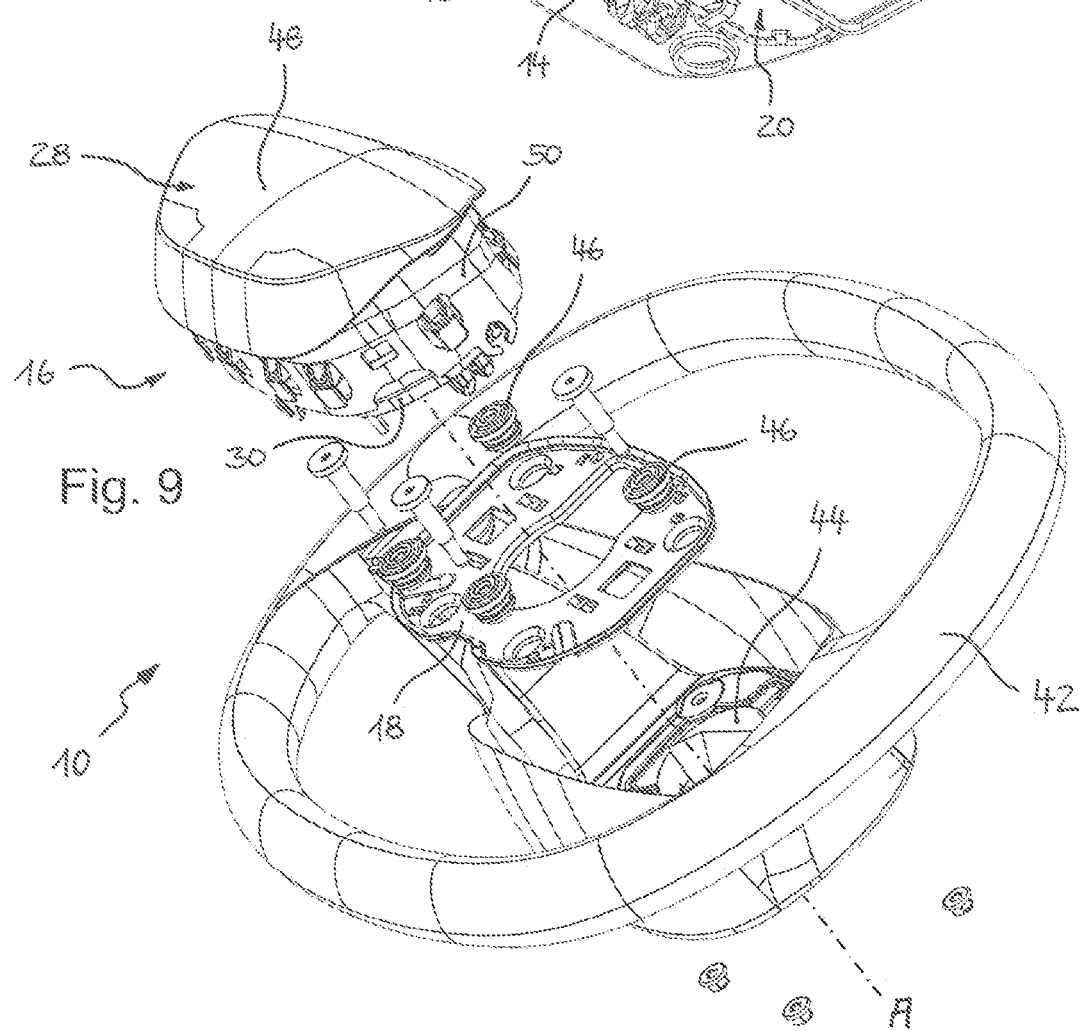

AIRBAG MODULE, METHOD FOR MOUNTING SAID AIRBAG MODULE AND STEERING ASSEMBLY COMPRISING SUCH AIRBAG

RELATED APPLICATION

This application claims priority from German Application No. 10 2018 127 637.0, filed Nov. 6, 2018, the subject matter of which is incorporated herein by reference in its entirety.

BACKGROUND OF THE INVENTION

The invention relates to an airbag module for an occupant restraint system, a method for mounting said airbag module as well as a steering assembly comprising such airbag module.

Front airbag modules for restraining vehicle occupants are usually disposed, on the driver side, in the hub area of the steering wheel so that, upon activation of the module after a vehicle crash, an airbag deploys in front of and protects the vehicle occupant.

In view of the mounting method, usually at first the steering wheel without the airbag module is secured to the steering column and subsequently the airbag module is connected to, especially latched with, the steering wheel hub. Latching advantageously enables easy, reliable and extremely quick mounting of the airbag module without any tools being required.

In order to ensure safe module latching in conventional steering assemblies, during mounting the airbag module is "over-pressed", i.e. is displaced in the mounting direction beyond its target position until latching is effectuated, and subsequently is returned to the target position again.

Such over-pressing of the airbag module is easily possible when the clearance between a module cap of the airbag module and a surrounding component, especially a steering wheel lining, is sufficiently large. However, there are made endeavors to minimize the gap widths in the final position of the airbag module and to realize gap widths of significantly less than 1 mm. In many cases, with those small gap widths over-pressing is no longer possible or is possible only when the module cap and/or the adjacent steering wheel lining is/are undesirably deformed.

SUMMARY OF THE INVENTION

It is the object of the invention to provide an airbag module which, when mounting the module, safely latches on the steering wheel without over-pressing the module cap as well as a steering assembly which can show especially small gap widths between the module cap of the airbag module and an adjacent steering wheel lining.

According to the invention, this object is achieved by an airbag module for an occupant restraint system, comprising a module cap which faces an occupant in the mounted condition of the airbag module and comprising a module bottom which has a latch means for securing the airbag module on a vehicle component, wherein the module cap and the module bottom are movable toward each other along a mounting axis until they reach at first an axial pre-mounting position and then an axial final mounting position, the module cap and the module bottom having interacting pre-fixing elements which captively secure the module cap and the module bottom to each other in the pre-mounting position, and the module cap and the module bottom having interacting resistance contours which offer a predetermined mounting resistance during an axial relative movement of the module cap and the module bottom from the pre-mounting position to the final mounting position.

In its pre-mounting position, the airbag module has a larger axial dimension than in its final mounting position. The resistance contours already help to latch the airbag module being provided in the pre-mounting position safely to the steering wheel. Due to the larger axial module dimension in the pre-mounting position, when latching the module, the module cap is never moved beyond its axial target position. Only after mounting the module on the steering wheel is the airbag module moved from the pre-mounting position to the final mounting position. Not before the final mounting position of the airbag module does the module cap reach its target position in which the gap widths between the module cap and the surrounding steering wheel components may be extremely small and are within the magnitude of 0.5 mm, for example.

The module cap and the module bottom may have axial and radial play relative to each other in the final mounting position of the airbag module. Said play permits little movements between the module cap, on the one hand, and the module bottom and, resp., all module components secured to the module bottom such as the gas generator and the airbag, on the other hand. Consequently, due to its small gap widths or a separate steering wheel fixation the module cap may be fixed on the steering wheel to be largely immovable, whereas the remaining airbag module can be used as vibration absorber to minimize undesired steering wheel vibrations.

The resistance contours preferably are latching contours which latch the module cap and the module bottom in the final mounting position.

In accordance with one embodiment of the airbag module, the module cap is pot-shaped and has an axial end wall as well as a peripheral wall, the resistance contours being configured as an axially extending slit in the peripheral wall of the module cap and as a radial journal on the module bottom.

When viewed in the axial direction, the slit may at least in portion have a tangential slit width that is smaller than the maximum tangential dimension of the radial journal. In this way, a desired mounting resistance can be easily adjusted. Said mounting resistance is overcome by deformation, especially elastic deformation, of the slit edges and/or of the radial journal. Consequently, the radial journal and/or the peripheral wall of the module cap is preferably made, at least in the area of the slit, from resilient, especially elastically resilient material.

Especially preferred, the slit width at an end of the peripheral wall remote from the axial end wall is smaller than the maximum tangential dimension of the radial journal and increases in the direction of the axial end wall until it is larger than the maximum tangential dimension of the radial journal. In this way, between the module cap and the module bottom axial and radial play can be realized with little effort in the final mounting position of the airbag module. As mentioned already above, said play permits advantageous vibration absorption in the vehicle steering system.

Furthermore, the invention also comprises a steering assembly for a vehicle steering system, comprising a steering wheel including a steering wheel skeleton, an afore-described airbag module and a steering wheel-side mounting plate for securing the airbag module on the steering wheel skeleton, wherein the latch means on the module bottom of the airbag module is a first latch means which, when axially moving relative to the mounting plate, latches with a second latch means provided on the mounting plate, and wherein a mounting resistance for latching the first and second latch means is lower than a mounting resistance of the resistance contours when transferring the airbag module from the pre-mounting position to the final mounting position.

The module cap may include a securing means which connects the module cap in the final mounting position of the airbag module directly to the steering wheel. Said securing means ensures a largely zero-clearance connection between the module cap and the steering wheel transversely to the mounting axis, thus allowing not only a small but also an especially uniform gap width to be realized. In the axial direction, the securing means can equally provide for a largely zero-clearance connection or alternatively can permit a restricted axial relative movement between the module cap and the steering wheel, for example for blowing the horn.

According to one embodiment of the steering assembly, the mounting plate is axially arranged as a separate component between the airbag module and the steering wheel skeleton. In this case, the mounting plate is secured to the steering wheel skeleton in a preferably oscillating manner, thus allowing advantageous vibration absorption, i.e. minimization of undesired steering wheel vibrations, to be achieved in the vehicle steering system.

In alternative configuration variants, the mounting plate may be integrated in one piece in the steering wheel skeleton.

Finally, the invention also relates to a method for mounting an airbag module on a steering wheel for forming an afore-described steering assembly, the method comprising the following steps of:
 a) providing the airbag module in its axial pre-mounting position;
 b) providing a steering wheel including a steering wheel skeleton and a mounting plate secured on the steering wheel skeleton for the airbag module;
 c) feeding the airbag module along the mounting axis in the direction of the steering wheel skeleton; and
 d) applying an axial mounting pressure to the module cap of the airbag module, thus at first causing the latch means of the airbag module and of the mounting plate to form a latching connection and only thereafter causing the airbag module to be transferred from its pre-mounting position to its final mounting position.

Said mounting method enables the airbag module to be safely and reliably latched to the mounting plate and, resp., to the steering wheel without the module cap being moved axially beyond its finally intended target position during mounting.

According to one method variant, in step b) the mounting plate is secured to the steering wheel skeleton via vibration dampers so that the mounting plate and the steering wheel skeleton are connected in an oscillating manner. This helps to use the airbag module, possibly with the exception of the module cap, advantageously as vibration damper for reducing steering wheel vibrations.

Further, when transferring the airbag module from the pre-mounting position to the final mounting position, in step d) the module cap at the same time can also be directly fixed to the steering wheel, especially latched with the steering wheel. This helps to realize an especially uniform gap width between the module cap and an adjacent steering wheel component with little effort.

BRIEF DESCRIPTION OF THE DRAWINGS

Further features and advantages of the invention will be evident from the following description of a preferred embodiment with reference to the drawings, wherein:

FIG. 8 shows the perspective view of the airbag module according to FIG. 6 in its final mounting position after latching with the mounting plate; and FIG. 9 shows a perspective exploded view of a steering assembly according to the invention.

FIGS. 1 through 9 illustrate a steering assembly 10 for a vehicle steering system, comprising a first coupling component which includes a rigid latch hook 12 and a second coupling component which includes a pre-mounted spring element 14, wherein the two coupling components are movable toward each other along a mounting axis A until a portion of the spring element 14 engages behind the at least one latch hook 12 in a securing position and interconnects the coupling components (see FIG. 5).

DESCRIPTION

In the present example embodiment, the first coupling component is an airbag module 16 and the second coupling component is a mounting plate 18.

It is easily evident to those skilled in the art, of course, that alternatively also the mounting plate 18 could include the latch hook 12 and the airbag module 16 could include the pre-mounted spring element 14. In this case, consequently the mounting plate 18 would be the first coupling component and the airbag module 16 would be the second coupling component. Analogously, the general connection concept described in the following can be easily conferred upon such configuration variant as well.

Figure 1:
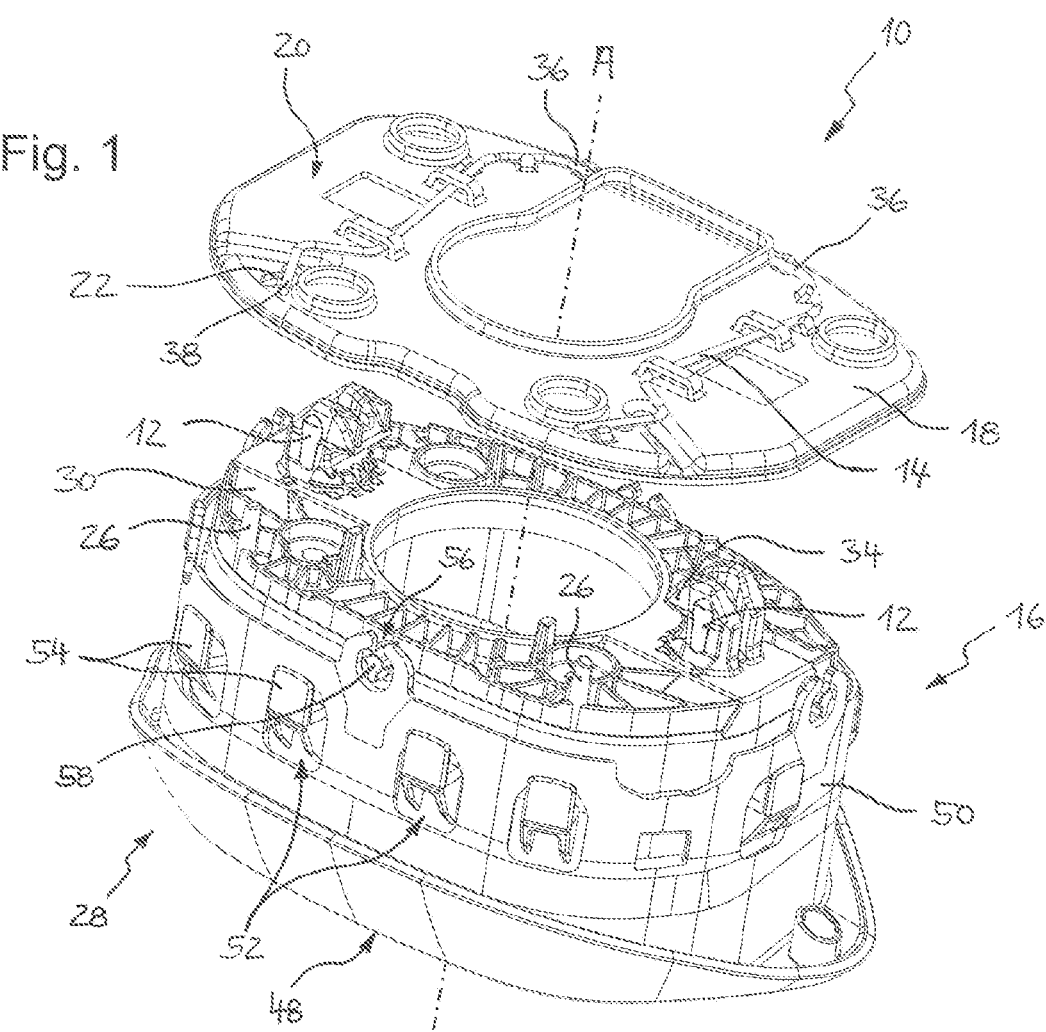
FIG. 1 shows a perspective view of a steering assembly according to the invention comprising an airbag module according to the invention and a mounting plate.
Figure 2:
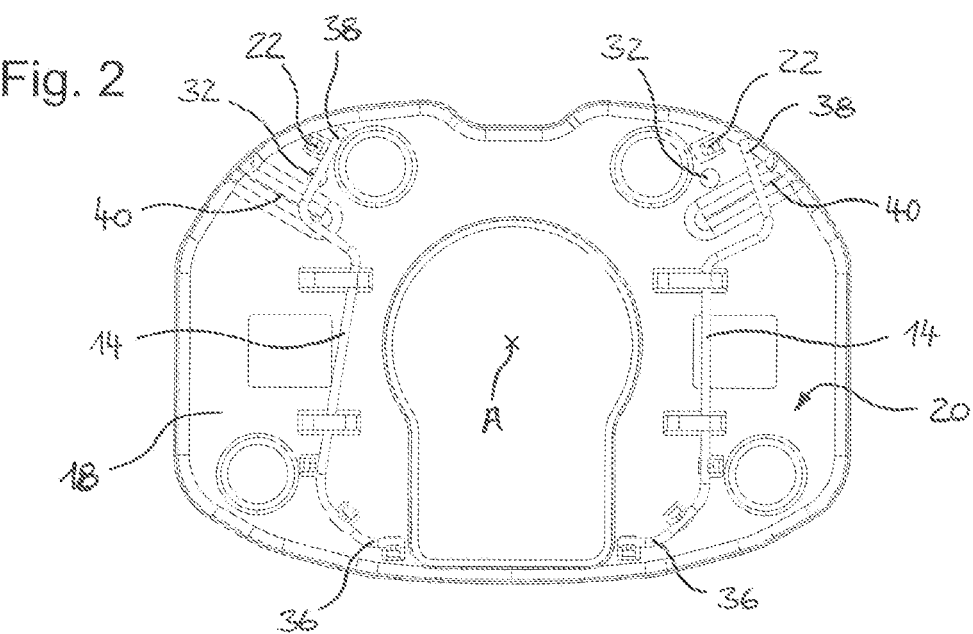
FIG. 2 shows an axial top view onto the mounting plate of the steering assembly according to FIG. 1.

By way of FIGS. 1 and 2, it becomes clear that in the present example embodiment two rigid latch hooks 12 as well as two separate spring elements 14 are provided, with a spring element 14 being assigned to each latch hook 12. As an alternative, the two spring elements 14 may also be formed in one piece, for example as a U-shaped spring, wherein then a movable spring leg would be assigned to each latch hook 12. In general, also configuration variants in which a different number of latch hooks 12 is provided are imaginable.

According to FIG. 1, the spring elements 14 are arranged on an axial end face 20 of the mounting plate 18 remote from the airbag module 16.

Each spring element 14 is movable between a coupling position in which the spring element 14 is largely relaxed and can engage behind the at least one latch hook 12 (cf. FIG. 2, right-hand spring element 14) and a decoupling position in which the spring element 14 is tensioned and is spaced apart from the latch hook 12 transversely to the mounting axis A (cf. FIG. 2, left-hand spring element 14).

The mounting plate 18 includes a retaining element 22 for fixing the spring element 14 in the decoupling position, with the retaining element 22 in the illustrated embodiment being a projection formed integrally with the mounting plate 18 which axially projects from the end face 20 of the mounting plate 18.

Figure 3:
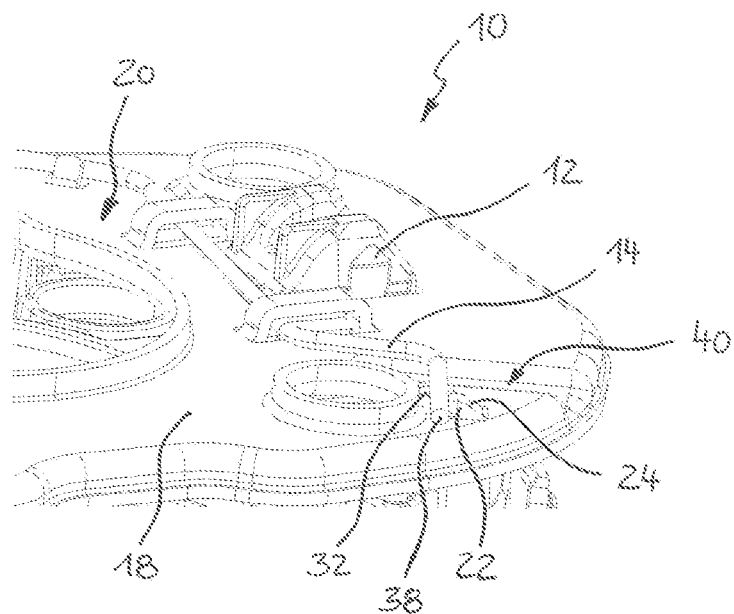
FIG. 3 shows a perspective detail view of the steering assembly according to FIG. 1 when mounting the airbag module to the mounting plate.

Concretely speaking, said projection is a ramp, wherein a ramp slope 24 in the coupling position of the spring element 14 faces the spring element 14 (FIG. 5) and in the decoupling position of the spring element 14 is remote from the spring element 14 (FIG. 3).

In order to release the spring element 14 from its tensioned decoupling position, the airbag module 16 includes an actuating element 26 spaced apart from the latch hook 12.

According to FIG. 1, the airbag module 16 comprises, inter alia, a module cap 28 which in the mounted state of the airbag module 16 faces an occupant, and a module bottom 30 which includes the latch hooks 12 for securing the airbag module 16 on a vehicle component, especially on a vehicle steering wheel. The actuating element 26 in this case is a pin-shaped projection which extends from a side of the module bottom 30 facing the mounting plate 18 axially in the direction of the mounting plate 18 and in the decoupling position of the spring element 4 is axially aligned with a portion of the spring element 14.

Here, the module bottom 30 is manufactured as an injection-molded part of robust plastic material, with the actuating element 26 being especially integrally formed with the module bottom 30.

According to FIG. 2, the mounting plate 18 includes an axial through-hole 32 which is axially aligned with the actuating element 26, the actuating element 26 extending through said through-hole 32 for releasing the spring element 14 from its tensioned decoupling position.

In the following, the mounting operation of the airbag module 16 on the mounting plate 18 will be briefly explained by way of FIGS. 3 to 5.

At the beginning of the mounting operation, the spring element 14 pre-mounted to the mounting plate 18 is in its tensioned decoupling position in which the spring element 14 is spaced apart from the latch hook 12 transversely to the mounting axis A. According to FIG. 3, when the airbag module 16 is axially fed, the latch hook 12 may consequently move unhindered past the side of the spring element 14 without axially or radially loading the spring element 14.

Figure 4:
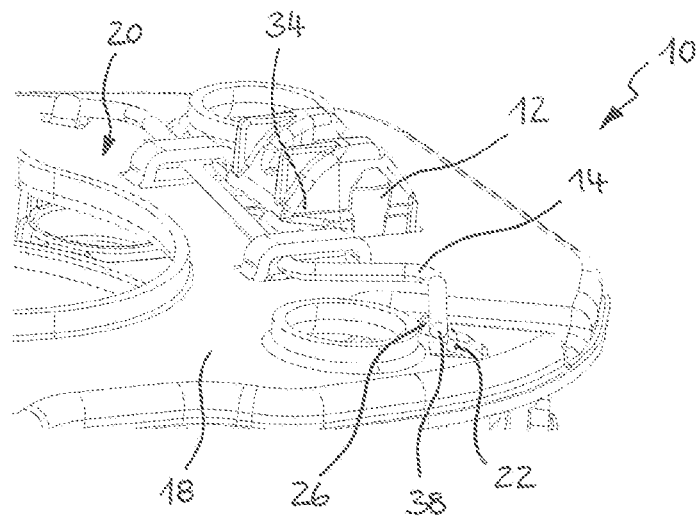
FIG. 4 shows the perspective detail view according to FIG. 3 just before latching between the airbag module and the mounting plate.

When, according to FIG. 4, an axial relative position is reached in which a latch lug 34 of the latch hook 12 has passed the spring element 14, the pin-shaped actuating element 26 gets into contact with the spring element 14 and loads the spring element 14 in the axial direction. The spring element 14 thus slides past the retaining element 22 until it snaps radially outwardly into its coupling position.

Figure 5:
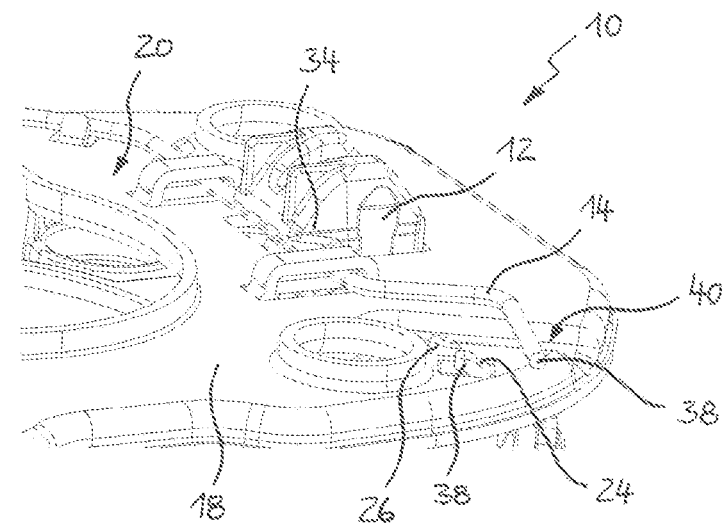
FIG. 5 shows the perspective detail view according to FIG. 3 after latching between the airbag module and the mounting plate.

In the coupling position according to FIG. 5, the spring element 14 engages behind the latch hook 12, concretely speaking the latch lug 34 of the latch hook 12, so that the airbag module and the mounting plate are coupled to each other and are fixed relative to each other in an axial securing position. Compared to the decoupling position, in the coupling position the spring element 14 is relaxed, wherein even in the coupling position certain residual tension may still be provided, however.

Thus, mounting of the airbag module 16 on the mounting plate 18 is completed.

It is clearly visible by way of FIG. 2 that the spring element 14 includes a tight spring end 36 fixed to the mounting plate 18 and a radially movable free spring end 38. In the area of the free spring end 38, a dismounting groove 40 for dismounting the airbag module 16 is provided on the end face 20 of the mounting plate 18. Said dismounting groove 40 extends substantially in the radial direction and is accessible by a tool from outside the steering wheel even in a condition of the airbag module 16 mounted on the vehicle steering wheel. The tool then is adapted to be radially inserted into the dismounting groove 40 and can return the spring element 14 to its decoupling position according to FIG. 3 so that the airbag module 16 can be easily removed from the mounting plate 18 again in the axial direction.

The steering assembly 10 also comprises, according to FIG. 9, a steering wheel 42 including a steering wheel skeleton 44, with the mounting plate 18 being axially arranged as a separate component between the airbag module 16 and the steering wheel skeleton 44.

In the illustrated example embodiment of the steering assembly 10, the mounting plate 18 is secured to the steering wheel skeleton 44 via vibration dampers 46 so that the mounting plate 18 and the steering wheel skeleton 44 are connected in an oscillating manner.

Figure 6:
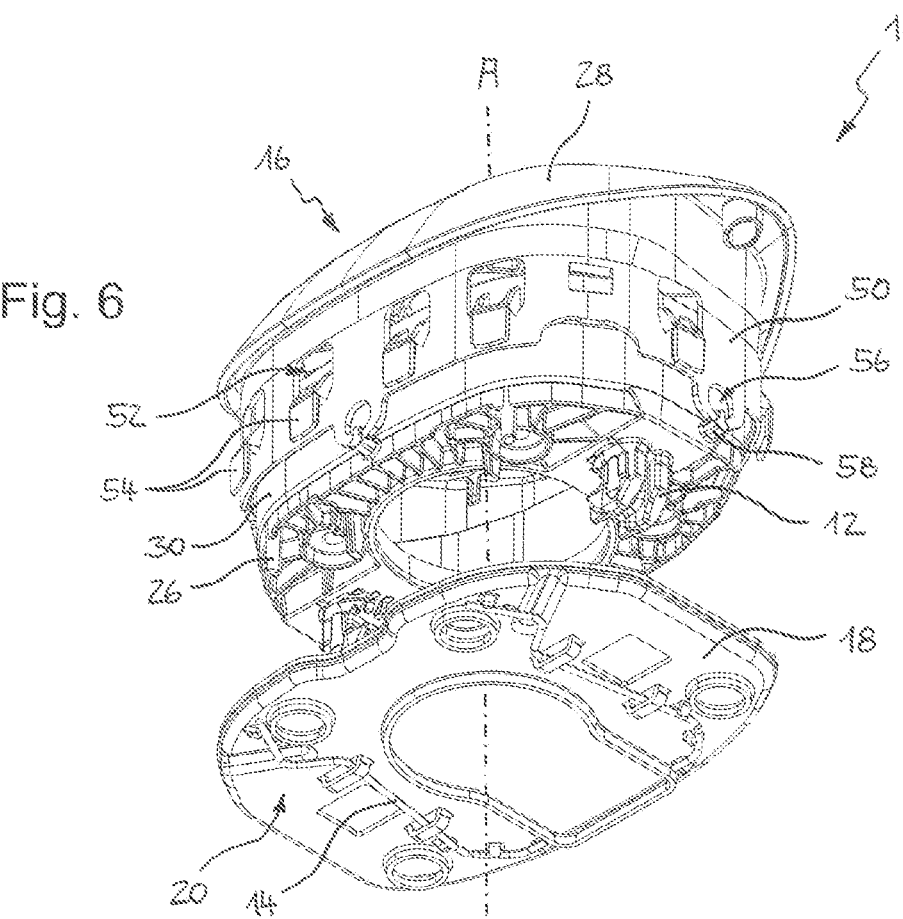
FIG. 6 shows a perspective view of an airbag module according to the invention in its pre-mounting position before latching with a mounting plate.
Figure 7:
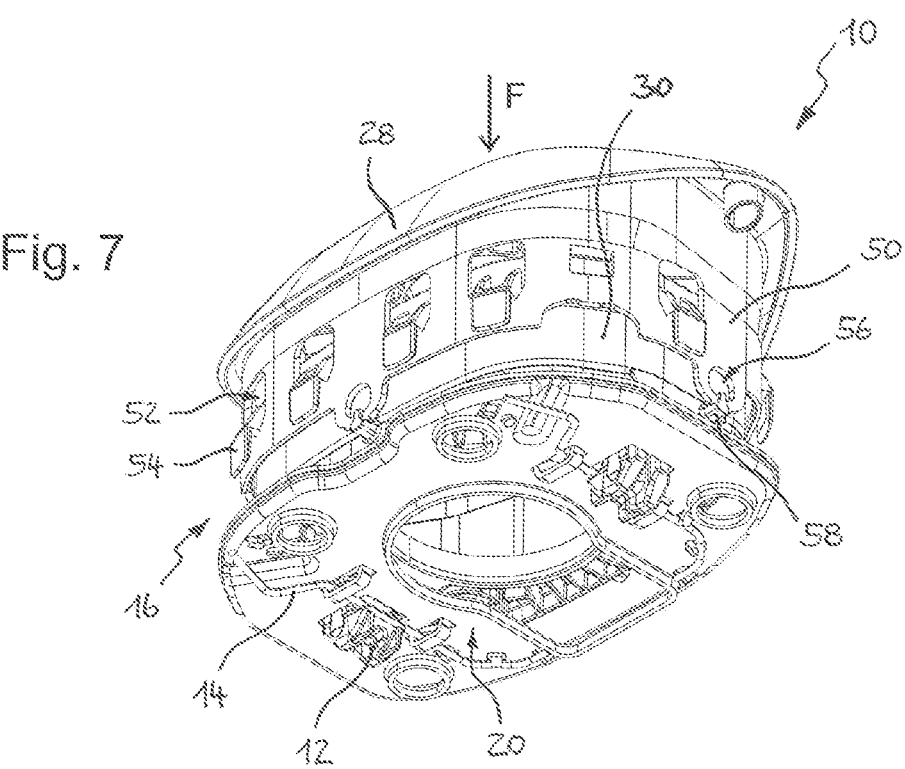
FIG. 7 shows the perspective view of the airbag module according to FIG. 6 in its pre-mounting position after latching with the mounting plate.

FIGS. 6 to 8 illustrate perspective views of the steering assembly 10 by way of which special features of the airbag module 16 for an occupant restraint system will be explained in the following.

The airbag module 16 comprises, according to FIGS. 6 to 8, the module cap 28 which in the mounted condition of the airbag module 16 faces an occupant and the module bottom 30 which includes a latch means in the form of a latch hook 12 for securing the airbag module 16 to a vehicle component, especially to a mounting plate 18 or a vehicle steering wheel.

The module cap 28 and the module bottom 30 are movable toward each other along a mounting axis A until they reach at first a pre-mounting position (FIGS. 6 and 7) and then an axial final mounting position (FIG. 8), wherein the module cap 28 and the module bottom 30 include interacting pre-fixing elements which captively secure the module cap 28 and the module bottom 30 to each other in the pre-mounting position.

In the present example embodiment, the module cap 28 is pot-shaped and has an axial end wall 48 and a peripheral wall 50. As pre-fixing elements in the peripheral wall 50 of the module cap 28 plural pre-mounting windows 52 are provided and at the module bottom 30 plural pre-mounting hooks 54 are provided each of which engages in an assigned pre-mounting window 52 and which thus captively connect the module cap 28 and the module bottom 30 in the pre-mounting position of the airbag module 16. In this manner, the airbag module 16 in its pre-mounting position forms a structural unit which can be easily transported and further processed. The pre-fixing elements do not provide for a rigid zero-clearance connection, however, but permit a certain relative movement between the module cap 28 and the module bottom 30 both in the axial direction and in the radial direction.

Apart from the pre-fixing elements, the module cap 28 and the module bottom 30 further include interacting resistance contours which offer predetermined mounting resistance during axial relative movement of the module cap 28 and the module bottom 30 from the pre-mounting position to the final mounting position.

The resistance contours in the shown embodiment are especially latching contours for latching the module cap 28 and the module bottom 30 in the final mounting position.

Concretely speaking, the resistance contours are in the form of an axially extending slit 56 in the peripheral wall 50 of the module cap 28 at an axial end remote from the end wall 48 and in the form of a radial journal 58 at the module bottom 30.

The slit 56 includes, when viewed in the axial direction, at least in portion a tangential slit width s that is smaller than a maximum tangential dimension $t_{max}$ of the radial journal 58. This results in the mounting resistance upon movement from the pre-mounting position to the final mounting position.

Especially, at an end of the peripheral wall 50 remote from the axial end wall 48, the slit 56 has a first slit width $s_1$ smaller than the maximum tangential dimension $t_{max}$ of the radial journal 58, wherein the slit width s then is increasing toward the axial end wall 48 until it reaches a second slit width $s_2$ larger than the maximum tangential dimension $t_{max}$ of the radial journal 58.

By way of the detail cutout concerning FIG. 10, it is evident that the radial journal 58 in the shown final mounting position of the airbag module 16 is spaced apart from the edges of the slit 56 transversely to the radial direction.

Hence, in the final mounting position of the airbag module 16 a relative movement between the module cap 28 and the module bottom 30 is not obstructed by the resistance contours so that the module cap 28 and the module bottom 30 relative to each other have axial and radial play even in the final mounting position.

The radial journal 58 and/or the peripheral wall 50 of the module cap 28 is/are made from resilient, especially elastically resilient material, preferably from suitable plastic material, at least in the area of the slit 56.

Via parameters such as the material of the journal 58 and/or of the peripheral wall 50, a wall thickness of the peripheral wall 50 in the area of the slit 56 as well as the proportion between minimum slit width and maximum tangential dimension of the journal 58, a desired mounting resistance can be easily and precisely adjusted.

The afore-described airbag module 16 for an occupant restraint system forms a steering assembly 10 for a vehicle steering system together with the steering wheel 42 including a steering wheel skeleton 44 and the mounting plate 18 arranged on the steering wheel side for securing the airbag module 16 to the steering wheel skeleton 44. The latch means (latch hook 12) on the module bottom 30 of the airbag module 16 constitutes a first latch means which upon axial movement of the airbag module 16 relative to the mounting plate 18 latches with a second latch means (spring element 14) provided on the mounting plate 18, wherein a mounting resistance for latching the first and second latch means is lower than a mounting resistance of the resistance contours when transferring the airbag module 16 from the pre-mounting position to the final mounting position. This is illustrated in the mounting state according to FIG. 7, where the airbag module 16 still is in its pre-mounting position, but the latching of the airbag module 16 with the mounting plate 18 has been effectuated already. This can be properly realized especially when the airbag module 16 can be latched to the mounting plate 18 with low mounting resistance, viz. for example by latching as described before especially by way of the FIGS. 3 to 5.

In accordance with FIG. 9, the mounting plate 18 is axially arranged between the airbag module 16 and the steering wheel skeleton 44 of the steering wheel 42 as a separate component and is fastened to the steering wheel skeleton 44 in an oscillating manner via vibration dampers 46.

By virtue of the play between the module cap 28 and the module bottom 30 in the final mounting position of the airbag module 16, the module cap thus can be received with minimum gap width extremely true to size and substantially fixed in the steering wheel 42, whereas the remaining airbag module 16 including the mounting plate 18 is movable relative to the steering wheel 42 to a limited extent and thus advantageously can act as vibration absorber and can dampen undesired vibrations in the vehicle steering system.

Optionally, the module cap 28 may further include a securing means (not shown) which in the final mounting position of the airbag module 16 directly connects the module cap 28 to the steering wheel 42.

Hereinafter, finally mounting of the airbag module 16 on the steering wheel 42 for forming the steering assembly 10 shall be dealt with.

At first the airbag module 16 is provided in its pre-mounting position according to FIG. 6.

Moreover, the steering wheel 42 including the steering wheel skeleton 44 and the mounting plate 18 secured to the steering wheel skeleton 44 is provided. As illustrated in FIG. 9, the mounting plate 18 can be secured to the steering wheel skeleton 44 especially via vibration dampers 46 so that the mounting plate 18 and the steering wheel skeleton 44 are connected in an oscillating manner.

Subsequently, the airbag module 16 is fed toward the steering wheel skeleton 44 along the mounting axis A and, according to FIG. 7, an axial mounting force F is applied to the module cap 28 of the airbag module 16, wherein at first the latch means of the airbag module 16 and of the mounting plate 18, i.e. the latch hook 12 and the spring element 14, form a latching connection and only thereafter the airbag module 16 is transferred from its pre-mounting position to its final mounting position according to FIG. 8.

Optionally, the module cap 28 can be fixed substantially simultaneously directly to the steering wheel 42, especially latched with the steering wheel 42, when the airbag module 16 is transferred from the pre-mounting position to the final mounting position.

The invention claimed is:

1. An airbag module for an occupant restraint system, comprising:
   a module cap (28) which in the mounted condition of the airbag module (16) faces an occupant, and
   a module bottom (30) which includes a latch means for securing the airbag module (16) to a vehicle component,
   wherein the module cap (28) and the module bottom (30) are movable toward each other along a mounting axis (A) until they reach at first an axial pre-mounting position and then an axial final mounting position,
   wherein the module cap (28) and the module bottom (30) include interacting pre-fixing elements which captively secure the module cap (28) and the module bottom (30) to each other in the pre-mounting position, and
   wherein the module cap (28) and the module bottom (30) have interacting resistance contours which in an axial relative movement of the module cap (28) and the module bottom (30) from the pre-mounting position to the final mounting position have a predetermined mounting resistance.

2. The airbag module according to claim 1, wherein in the final mounting position the module cap (28) and the module bottom (30) have axial and radial play relative to each other.

3. The airbag module according to claim 1, wherein the resistance contours are latching elements which are latched together in the final mounting position to latch the module cap (28) and the module bottom (30) together in the final mounting position, the latching elements being unlatched in the pre-mounting position.

4. The airbag module according to claim 3, wherein the latching elements are separate from the pre-fixing elements.

5. The airbag module according to claim 1, wherein the module cap (28) is pot-shaped and has an axial end wall (48) as well as a peripheral wall (50), wherein the resistance contours are in the form of an axially extending slit (56) in the peripheral wall (50) of the module cap (28) and in the form of a radial journal (58) on the module bottom (30).

6. The airbag module according to claim 5, wherein the slit (56), when viewed in the axial direction, at least in portion has a tangential slit width ($S_1$) smaller than the maximum tangential dimension ($t_{max}$) of the radial journal (58).

7. The airbag module according to claim 6, wherein the slit width (s) is smaller at an end of the peripheral wall (50) remote from the axial end wall (48) than the maximum tangential dimension ($t_{max}$) of the radial journal (58) and is increasing in the direction of the axial end wall (48) until it is larger than the maximum tangential dimension ($t_{max}$) of the radial journal (58).

8. The airbag module according to claim 5, wherein in the final mounting position, the radial journal (58) is inserted in the slit (56) and spaced apart from interior edges of the slit (56).

9. The airbag module according to claim 5, wherein the axial end wall (48) is a first axial end wall (48) and faces the occupant in the mounted condition of the airbag module, the module cap (48) having a second axial end wall that is separated from the first axial end wall (48) by the peripheral wall (50) and faces away from the occupant in the mounted condition of the airbag module, the slit (56) axially extending in the peripheral wall (50) from the second axial end wall toward the first axial end wall (48).

10. The steering assembly for a vehicle steering system, comprising:
a steering wheel (42) including a steering wheel skeleton (44),
an airbag module (16) according to claim 1, and
a steering wheel-side mounting plate (18) for securing the airbag module (16) to the steering wheel skeleton (44),
wherein the latch means on the module bottom (30) of the airbag module (16) is a first latch means which latches with a second latch means provided on the mounting plate (18) during an axial movement relative to the mounting plate (18),
wherein a mounting resistance for latching the first and second latch means is lower than a mounting resistance of the resistance contours when transferring the airbag module (16) from the pre-mounting position to the final mounting position.

11. The steering assembly according to claim 10, wherein the module cap (28) includes a securing means which in the final mounting position of the airbag module (16) connects the module cap (28) directly to the steering wheel (42).

12. The steering assembly according to claim 10, wherein the mounting plate (18) is axially arranged as a separate component between the airbag module (16) and the steering wheel skeleton (44).

13. The steering assembly according to claim 12, wherein the mounting plate (18) is secured to the steering wheel skeleton (44) in an oscillating manner.

14. A method for mounting an airbag module (16) according to claim 1, to a steering wheel (42) for forming a steering assembly, the method comprising the following method steps of:
providing the airbag module (16) in its axial pre-mounting position;
providing the steering wheel (42) including a steering wheel skeleton (44) and a mounting plate (18) secured to the steering wheel skeleton (44) for the airbag module (16);
feeding the airbag module (16) along the mounting axis (A) in the direction of the steering wheel skeleton (44);
applying an axial mounting force (F) to the module cap (28) of the airbag module (16), thus causing at first the latch means of the airbag module (16) and of the mounting plate (18) to form a latching connection and only thereafter causing the airbag module (16) to be transferred from its pre-mounting position to its final mounting position.

15. The method according to claim 14, wherein in step b) the mounting plate (18) is secured to the steering wheel skeleton (44) via vibration dampers (46) so that the mounting plate (18) and the steering wheel skeleton (44) are connected in an oscillating manner.

16. The method according to claim 14, wherein the module cap (28) is simultaneously fixed also directly on the steering wheel (42), especially latched with the steering wheel (42), when transferring the airbag module (16) from the pre-mounting position to the final mounting position in step d).

17. The airbag module according to claim 1, wherein the pre-fixing elements are in the form of a pre-mounting window (52) in a peripheral wall (50) of the module cap (28) and in the form of a pre-mounting hook (54) on the module bottom (30), the pre-mounting hook (54) extending through the pre-mounting window (52) in the pre-mounting position to captively secure the module cap (28) and the module bottom (30) to each other in the pre-mounting position.

18. The airbag module according to claim 1, wherein an axial length of the airbag module (16) is greater in the pre-mounting condition than in the final mounting condition.

19. The airbag module according to claim 1, wherein the module cap (28) and the module bottom (30) move toward each other along the mounting axis (A) from the pre-mounting position to the final mounting position as the airbag module (16) is mounted to a steering wheel (42).

* * * * *